(12) United States Patent  (10) Patent No.: US 6,266,812 B1
Yu  (45) Date of Patent: Jul. 24, 2001

(54) ADDRESSABLE CATV END-USER PAYMENT COLLECTION MANAGEMENT SYSTEM

(75) Inventor: Leo Yu, Taipei (TW)

(73) Assignee: NFOCOM Technology Co., Ltd., Taipei (TW)

( * ) Notice: Subject to any disclaimer, the term of this patent is extended or adjusted under 35 U.S.C. 154(b) by 0 days.

(21) Appl. No.: 09/372,058

(22) Filed: Aug. 11, 1999

(51) Int. Cl.[7] .............................. H04N 7/00; H04N 7/10; H04N 7/14; H04H 1/00; H04H 9/00
(52) U.S. Cl. .................................................. 725/5; 725/11
(58) Field of Search .................................... 348/12–13, 3, 348/9, 1; 455/2, 4.2

(56) References Cited

U.S. PATENT DOCUMENTS

| | | | |
|---|---|---|---|
| 4,475,123 | * 10/1984 | Dumbauld et al. | 358/114 |
| 5,247,575 | * 9/1993 | Sprague et al. | 455/2 |
| 5,270,809 | * 12/1993 | Gammie et al. | 455/2 |
| 5,475,585 | * 12/1995 | Bush | 364/401 |
| 5,559,548 | * 9/1996 | Davis et al. | 348/6 |
| 5,600,364 | * 2/1997 | Hendricks et al. | 348/1 |
| 5,642,418 | * 6/1997 | Farris et al. | 380/21 |
| 5,661,517 | * 8/1997 | Budow et al. | 348/13 |
| 5,854,703 | * 12/1998 | West, Jr. | 359/167 |
| 5,884,284 | * 3/1999 | Peters et al. | 705/30 |
| 6,009,465 | * 12/1999 | Decker et al. | 709/219 |

* cited by examiner

Primary Examiner—Andrew Faile
Assistant Examiner—Hai V. Tran
(74) Attorney, Agent, or Firm—Donald C. Casey, Esq

(57) ABSTRACT

A addressable CATV end-user payment collection management system, which includes a cable TV broadcasting system, the cable TV broadcasting system having a plurality of demodulators, which demodulate signals from different channels, a video signal main cable for signal output, a mixer, which mixes the signals received from the demodulators into an end-user receivable video signal, and then sends the mixed video signal to the end users through the video signal main cable, a payment collection computer data bank for storing and processing data of the end-users, and producing a control signal to a cable modem subject to the payment data of the end-users, a cable modem connected between the cable TV broadcasting system and the payment collection computer data bank for sending the control signal from the payment collection computer data bank to the mixer of the cable TV broadcasting system for mixing with the video signal for synchronous output; and a plurality of signal distributors respectively connected to the video signal main cable for distributing the video signal to the end-users, the signal distributors each having a programmable central processing unit for receiving the control signal from the payment collection computer data bank through the cable modem for closing/opening the line at each individual end-user.

2 Claims, 10 Drawing Sheets

ADDRESSABLE CATV END-USER PAYMENT COLLECTION MANAGEMENT SYSTEM

BACKGROUND OF THE INVENTION

The present invention relates to a management system for use in a cable TV system, and more particularly to an addressable CATV end-user payment collection management system, which provides the function of interception prohibition, addressed encryption, and automatic statistics collecting and accounting.

Cable TV has been well developed in advanced and developing countries. Most families in advanced and developing countries subscribe cable TV programs. End-user payment collection management is an important work to cable TV stations. Cable TV stations may use addressed encryption means and well-protected distributors to control signal transmission to individual end-users. However, address encryption means and interception prohibition means are quite expensive. Further, a cable TV station hires a big number of engineers and workers to handle delayed payment and nonpayment affairs. If an end-user didn't pay for the payment fell due a certain length of time after due date, the cable TV station may have to send an engineer to cut the line. When an overdue payment is paid, the cable TV station must send an engineer to resume the line. Because payment collection management is handled by labor, the labor cost is high. Therefore, there is a high demand for a cable TV end-user payment collection management system, which is inexpensive, and can automatically manage end-user payment collection, prevent an interception, and encrypt the channels.

SUMMARY OF THE INVENTION

The present invention has been accomplished under the circumstances in view. The addressable CATV end-user payment collection management system adopts the advanced bi-directional broadband network architecture. The system comprises a payment collection computer data bank, a RS-232 cable modem which connects the payment collection computer data bank to a CATV broadcasting system, a plurality of programmable control signal distributors, and a voice payment urging and end-user encryption channel setting system. The payment collection computer data bank is provided for storing and processing data of the end-users, and producing a control signal to the cable modem subject to the payment data of the end-users. The cable modem is connected between the cable TV broadcasting system and the payment collection computer data bank for sending the control signal from the payment collection computer data bank to the cable TV broadcasting system for mixing with the video signal for synchronous output. The signal distributors are respectively connected to the video signal main cable of the cable TV broadcasting system for distributing the video signal to the end-users, each comprising a programmable central processing unit for receiving the control signal from the payment collection computer data bank through the cable modem for closing/opening the line at each individual end-user.

DETAILED DESCRIPTION OF THE PREFERRED EMBODIMENT

Figure 1:
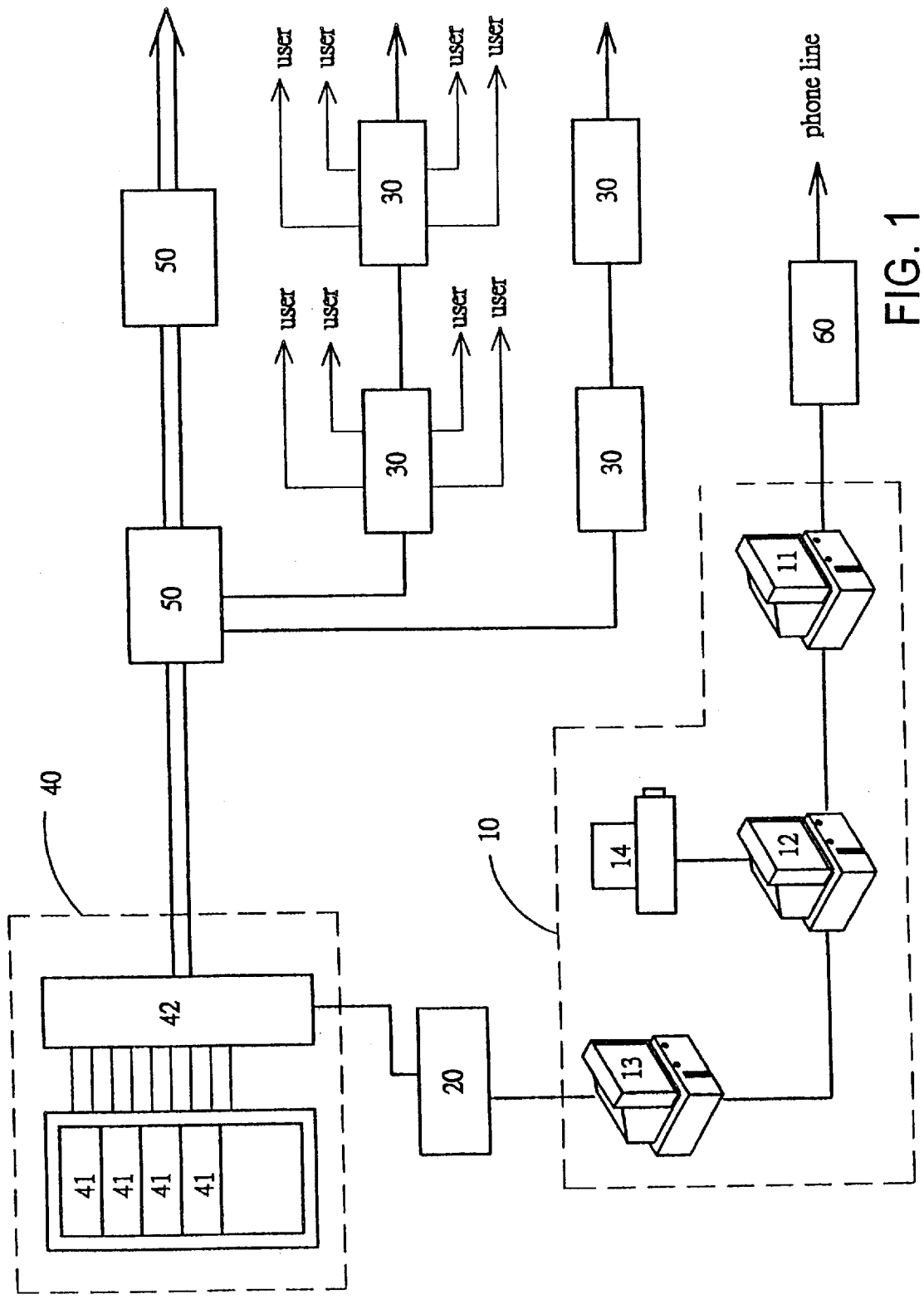
FIG. 1 is a system block diagram of an addressable CATV end-user payment collection management system according to the present invention.

Referring to FIG. 1, an addressable CATV end-user payment collection management system adopts the advanced bidirectional broadband network architecture. The system comprises a payment collection computer data bank 10, a RS-232 cable modem 20, which connects the payment collection computer data bank 10 to a CATV broadcasting system 40, a plurality of main cable distributors 50 arranged on a broad-band video signal main cable, a plurality of programmable control signal distributors 30 respectively connected to the main cable distributors 50, and a voice payment urging and end-user encryption channel setting system 60. The programmable control signal distributors 30 each comprise a CPU (central processing unit).

The payment collection computer data bank 10 stores end-users' data. The computer automatically processes daily overdue data of the end-users that are behind the time fixed for payment, and outputs a control signal to the cable modem 20 subject to a predetermined computer program set time.

The CATV broadcasting system 40 comprises a plurality of demodulators 41, which demodulate signals from different channels, a mixer 42, which mixes the signals from the demodulators 41 into subscriber receivable video signal, and then sends the mixed video signal to the end users through the programmable control signal distributors 30 via the main cable distributors 50.

The cable modem 20 uses the broad-band video signal transmission cable of the CATV broadcasting system 40 to transmit the control signal from the payment collection computer data bank 10 to the programmable control signal sub-distributors 30, to further close/open the end-user's channels. Because the carrier, which carries the control signal, occupies only a narrow top and channels (25 Khz), it does not affect the quality and quantity of current broadcasting programs.

The payment collection computer data bank 10 is comprised of a data bank server 11, at least one, for example, one front payment collection computer 12, and a system control computer 13. All CATV end-user data including, name, address, phone number, payment record, etc., are inputted into the payment collection computer data bank 10 through the front payment collection computer 12, and then stored in the data bank server 11. An output device, for example, a printer 4 may be connected to the front payment collection computer 12 for printing out debit note for every end-user. Further, accounting processing software, statistic analysis software, CATV network management software, etc. may be added to the payment collection computer data bank 10. The system control computer 13 is operated to send the control signal to the cable modem 20.

The voice payment urging and end-user encryption channel setting system 60 connects the payment collection computer data bank 10 to a phone line through a voice modem. Every end-user can use this system to encrypt the channels by means of a telephone, so as to prevent the children from watching the adult channels or any program that is not suitable for children.

Figure 2:
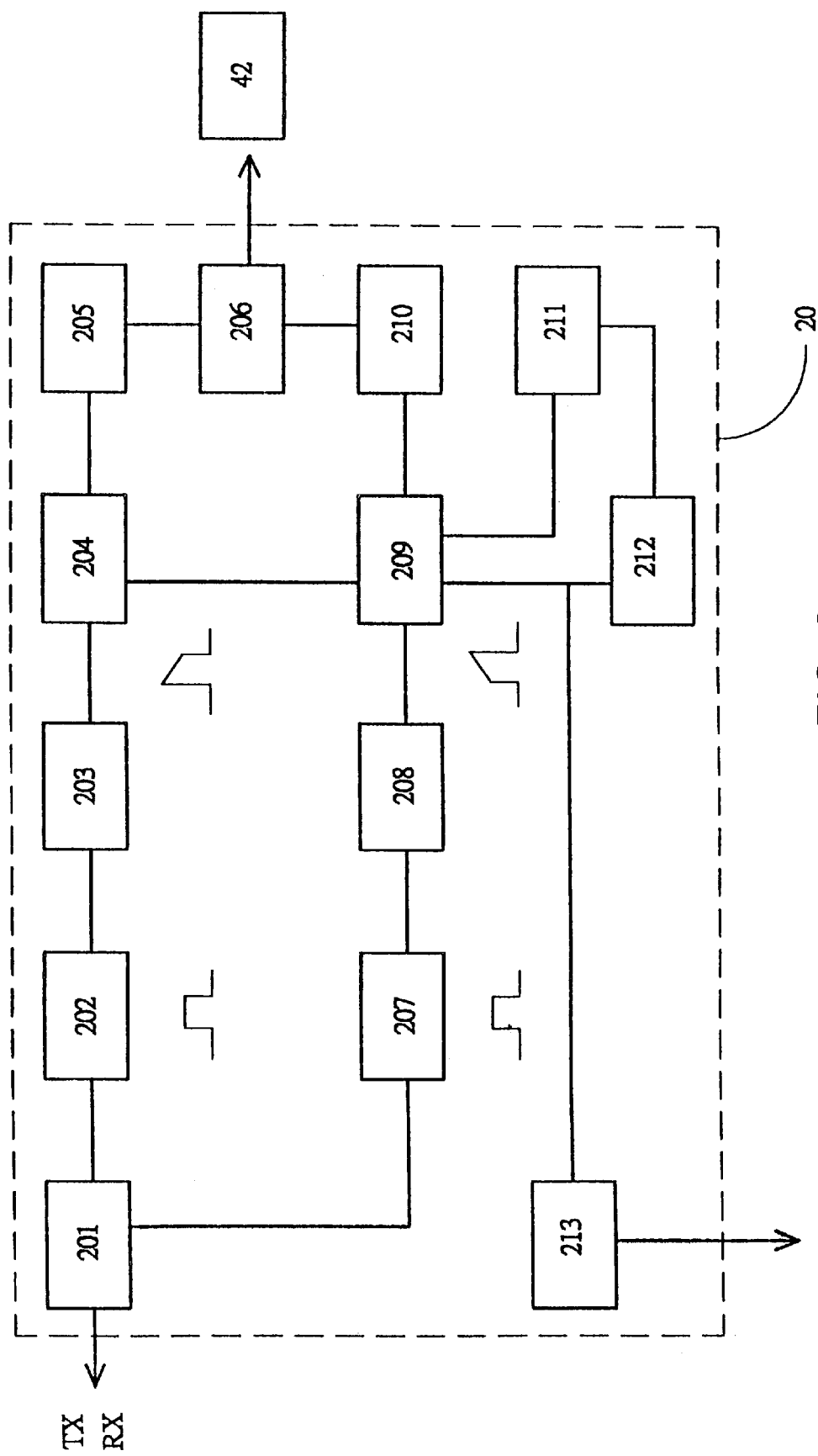
FIG. 2 is a circuit block diagram of a cable modem for the addressable CATV end-user payment collection management system according to the present invention.
Figure 3:
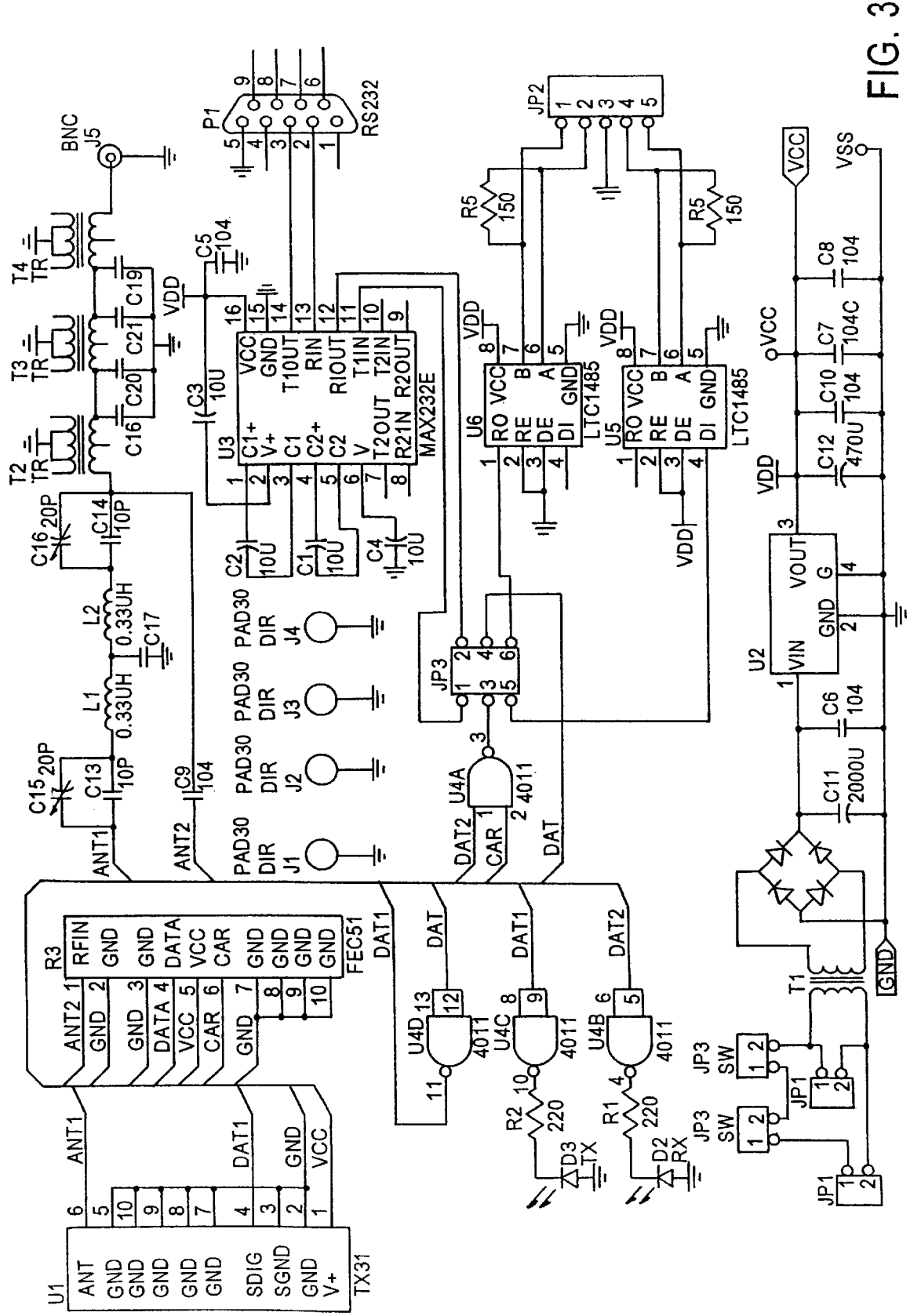
FIG. 3 is a circuit diagram of the cable modem shown in FIG. 2.

Referring to FIGS. 2 and 3, the cable modem 20 comprises a RS-232 wave shaping circuit 201, an amplitude limiter 202, a pre-enhancing circuit 203, a high-frequency modulation circuit 204, a high-pass filter circuit 205, a mixing circuit 206, a linear amplifier 207, a demodulation circuit 208, a high-frequency demodulation circuit 209, a low-pass filter circuit 210, a phase locking loop 211, a digital control circuit 212, a power supply shaping and filtering circuit 213.

Figure 4:
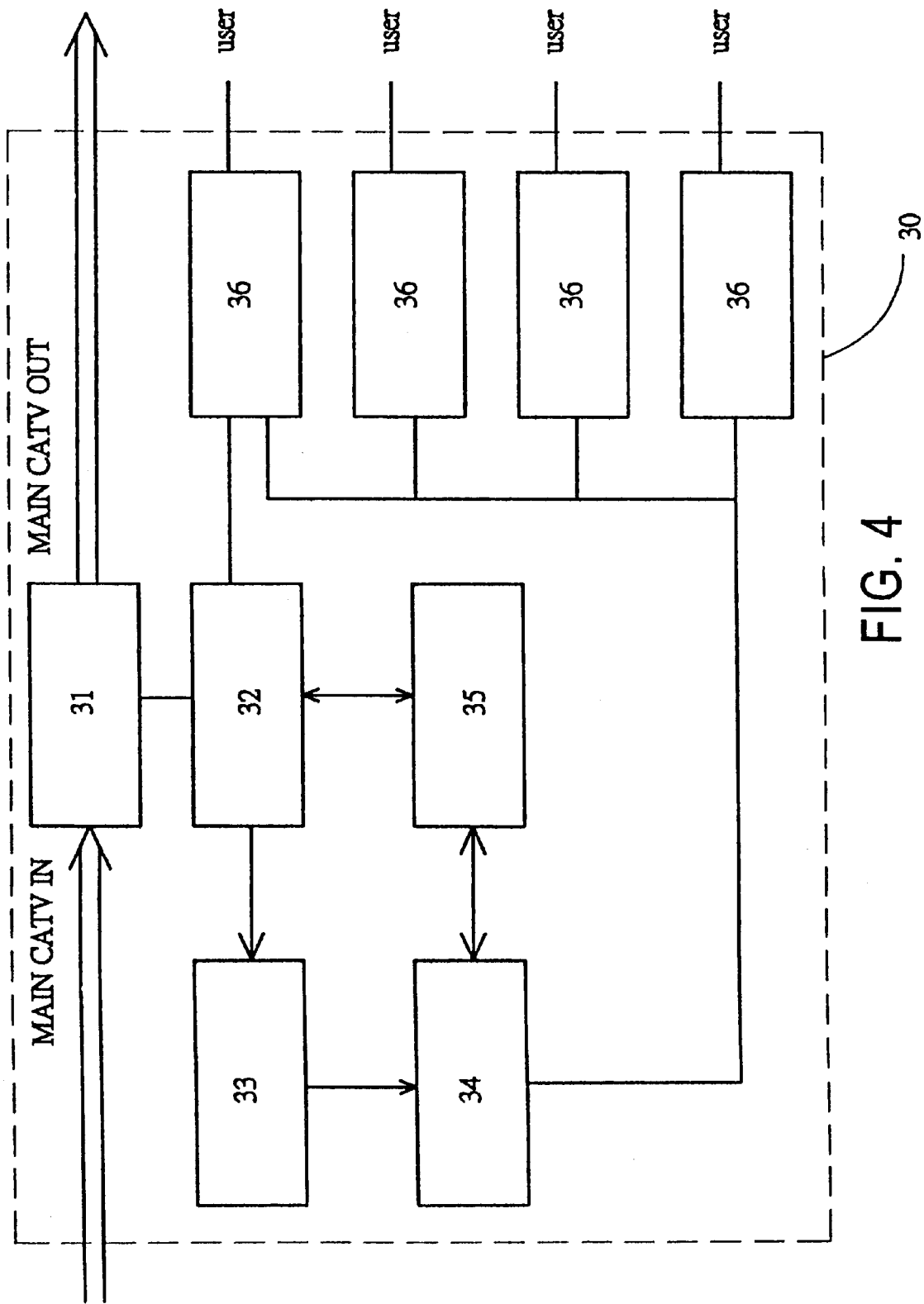
FIG. 4 is a circuit block diagram of a programmable control signal distributor for the addressable CATV end-user payment collection management system according to the present invention.
Figure 5:
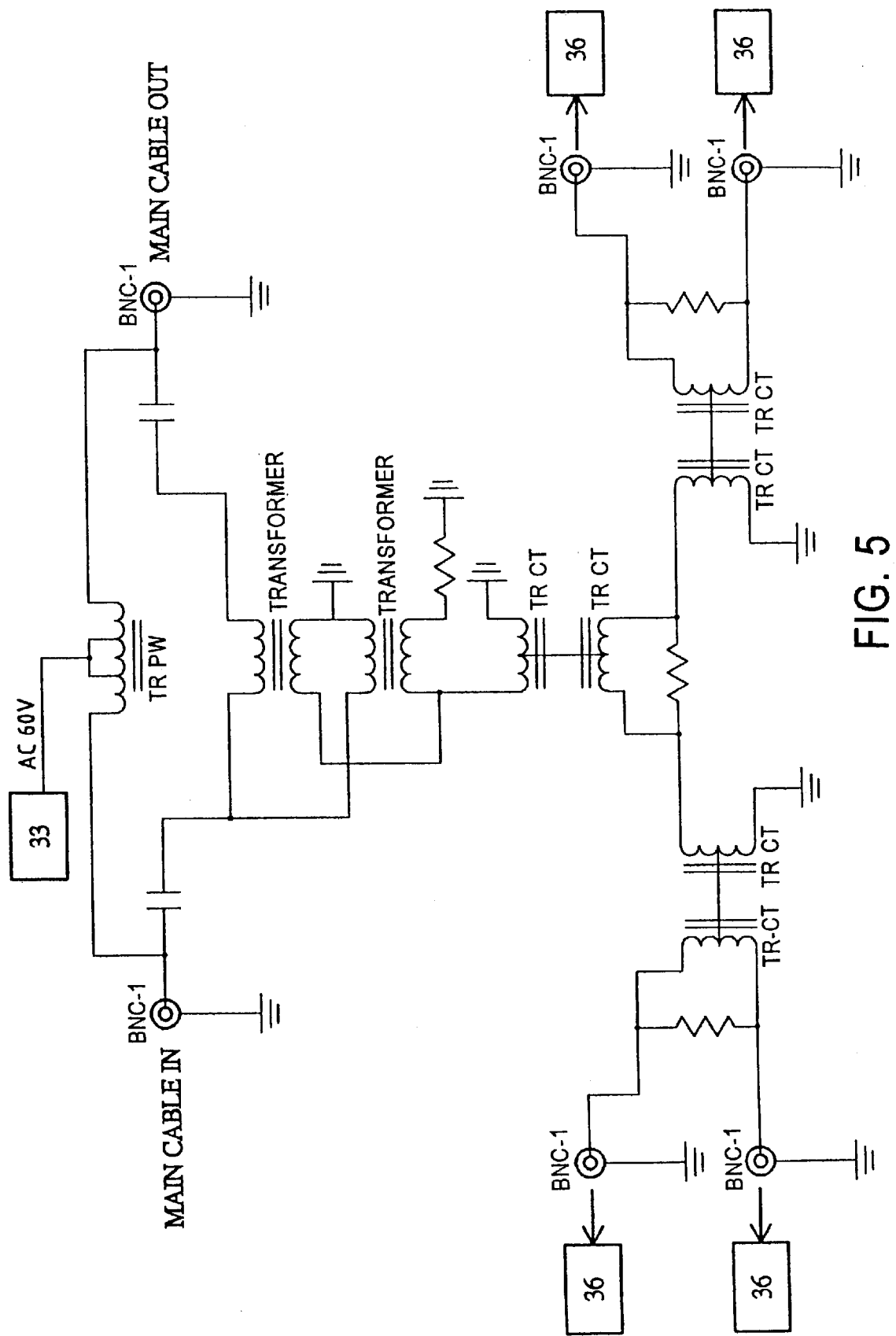
FIG. 5 is a circuit diagram of a main cable input output circuit for the addressable CATV end-user payment collection management system according to the present invention.
Figure 6:
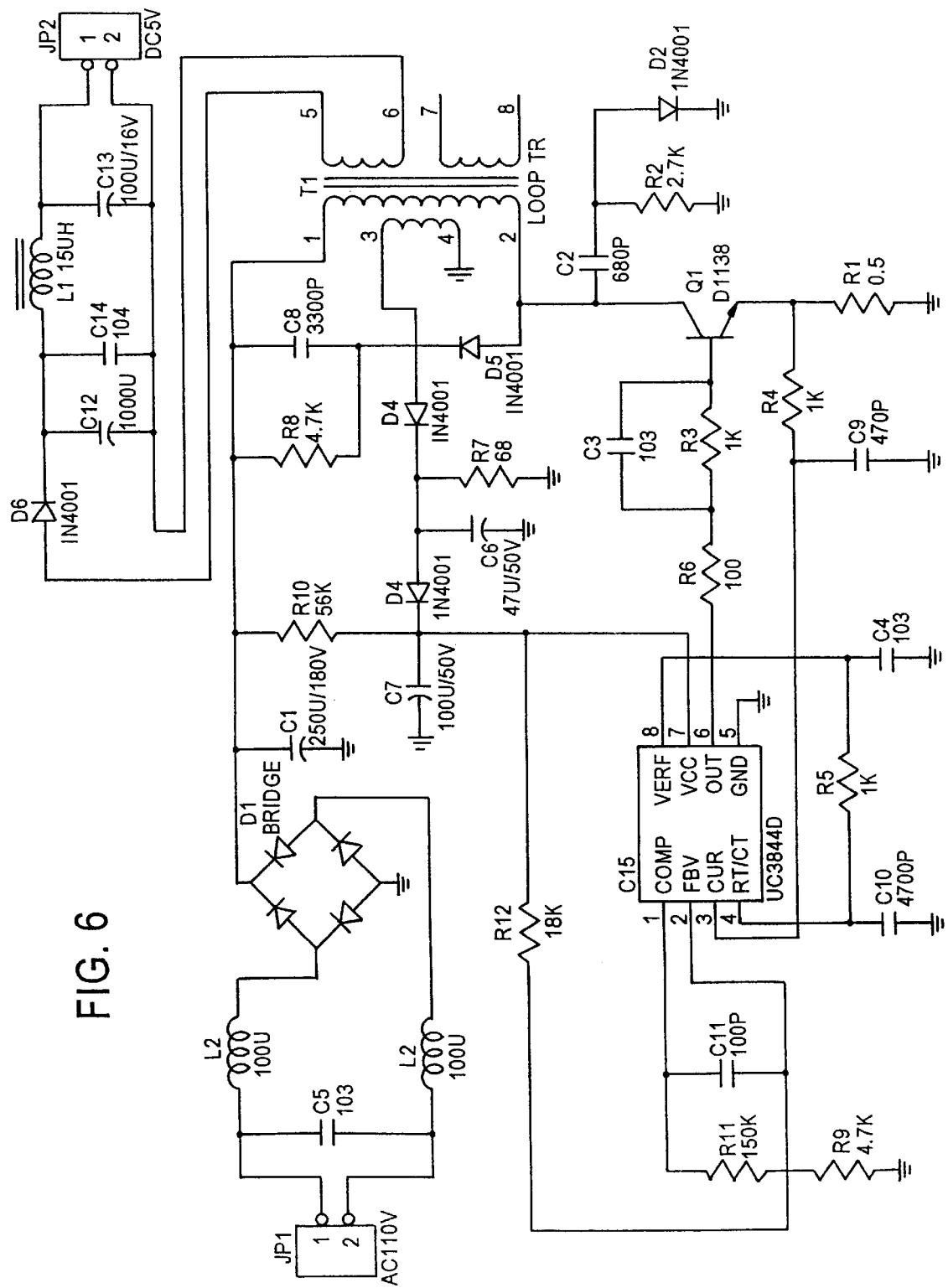
FIG. 6 is a circuit diagram of a switching type voltage stabilizing power circuit for the addressable CATV end-user payment collection management system according to the present invention.
Figure 8:
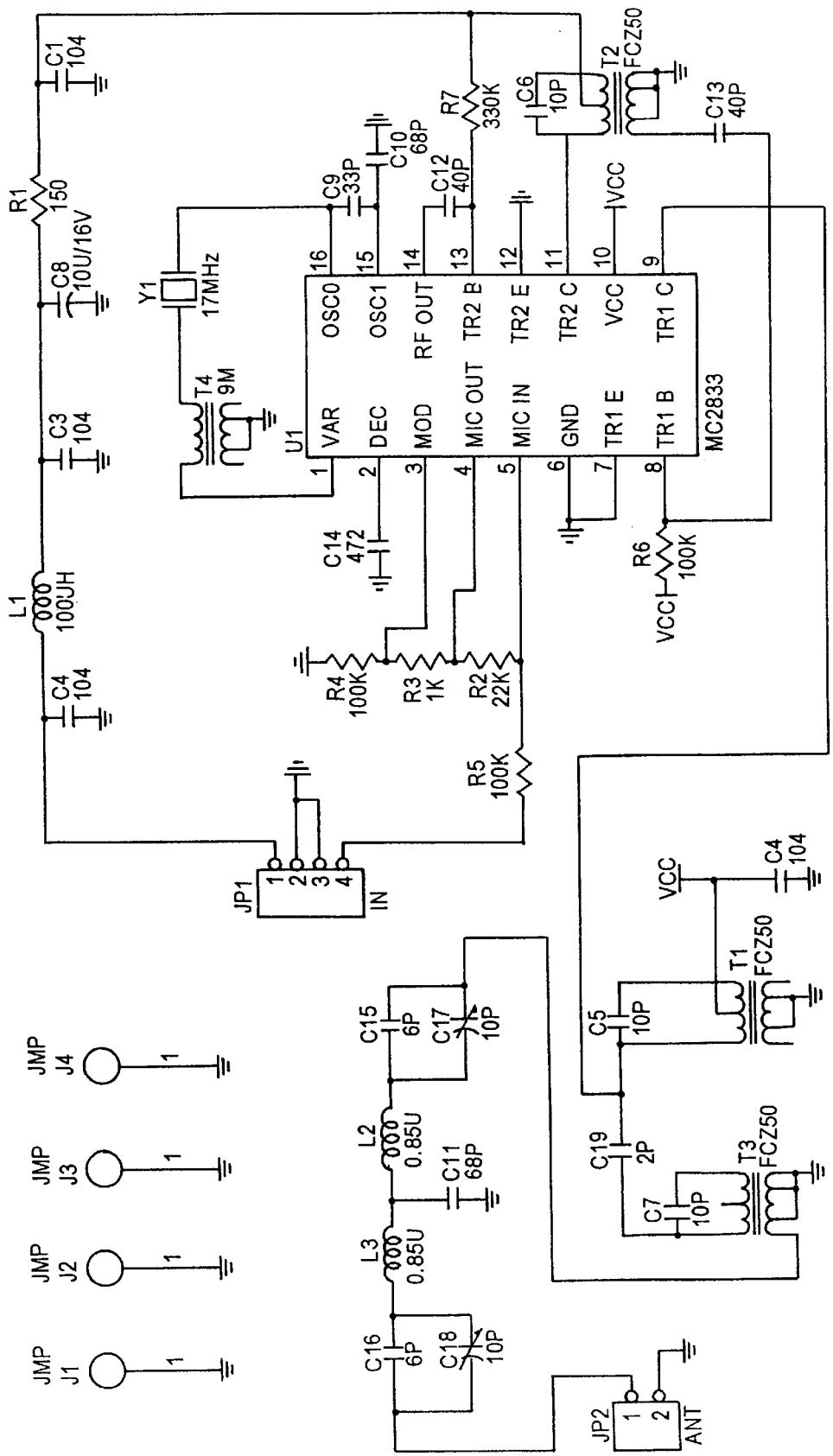
FIG. 8 is a circuit diagram of a forward control signal transmitter for a forward control signal transmitting receiving circuit for the addressable CATV end-user payment collection management system according to the present invention.
Figure 9:
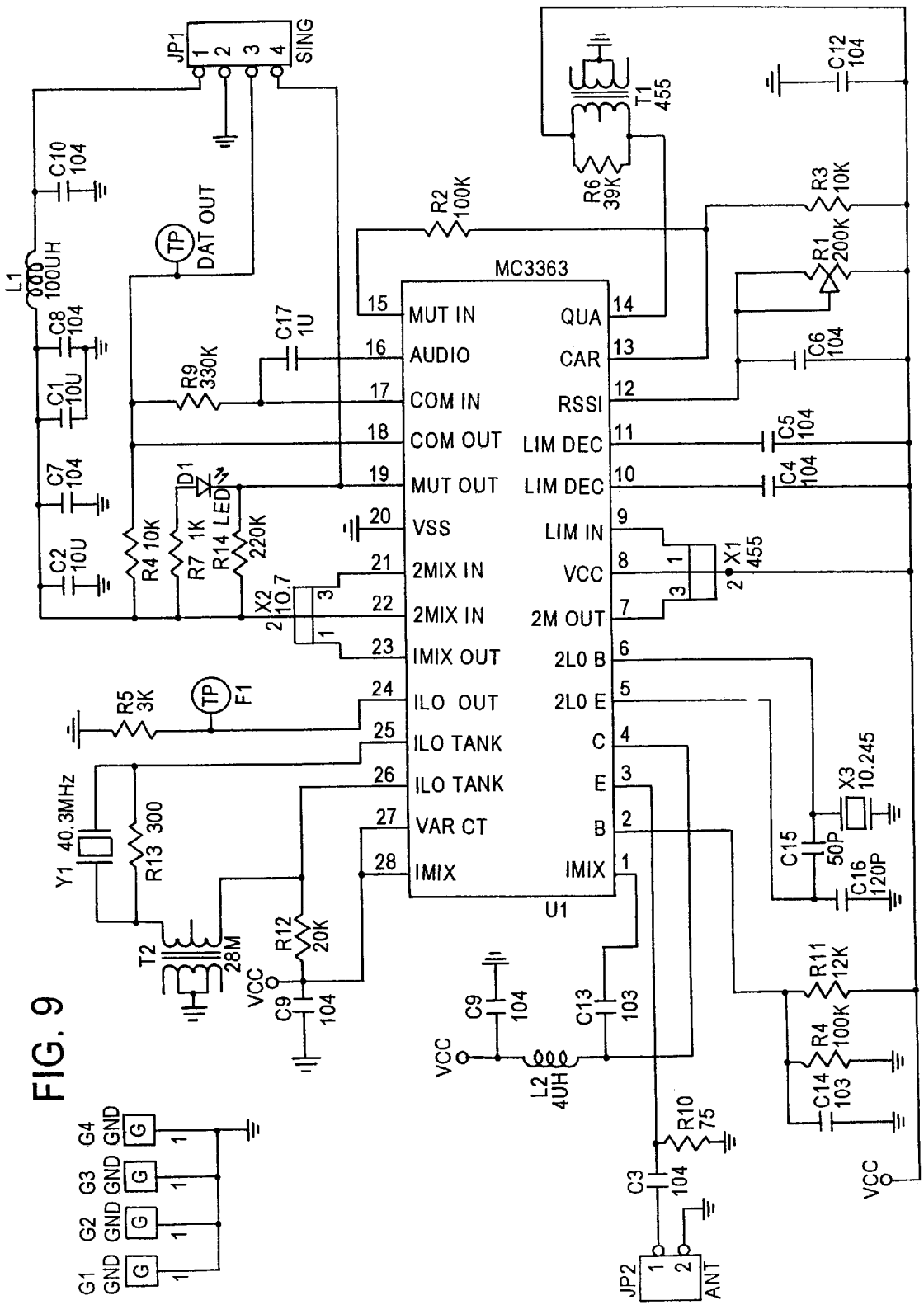
FIG. 9 is a circuit diagram of a signal receiver for a forward control signal transmitting receiving circuit for the addressable CATV end-user payment collection management system according to the present invention.

Referring to FIGS. 4 and 5, the programmable control signal distributor 30 comprises a main cable input output circuit 31 for main cable in from the main cable and main cable out to another programmable control signal distributor 30. The main cable input output circuit 31 is connected to a power and carrier signal separator circuit 32, which separates power supply from carrier signal, enabling power supply signal to be transmitted to a switching type voltage stabilizing power circuit 33 to provide a central processing unit control circuit 34 with the necessary working voltage, and carrier signal to be sent to a forward control signal transmitting and receiving circuit 35. Carrier signal is processed through the forward control signal transmitting and receiving circuit 35 for two-way signal transmission with the central processing unit control circuit 34 by means of a FSK circuit. The forward control signal transmitting and receiving circuit 35 comprises a forward control signal transmitter (see MC2833 in FIG. 8), which sends the monitoring signal produced by the central processing unit control circuit 34 back to the payment collection computer data bank 10, and a control signal receiver (see MC3363 in FIG. 9), which receives the control signal from the payment collection computer data bank 10, and then sends the control signal to the central processing unit control circuit 34.

Figure 7:
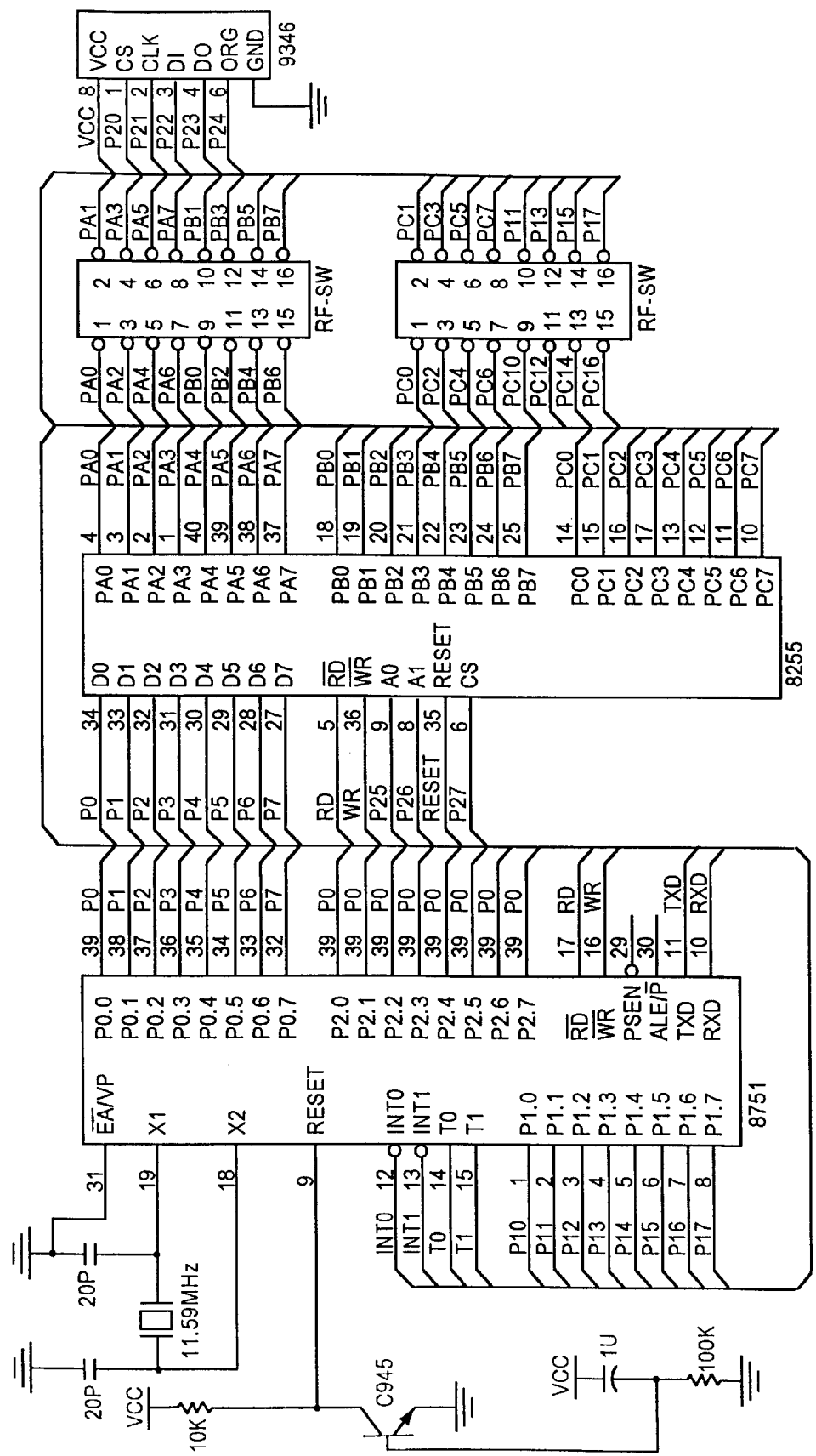
FIG. 7 is a circuit diagram of a central processing unit control circuit for the addressable CATV end-user payment collection management system according to the present invention.
Figure 10:
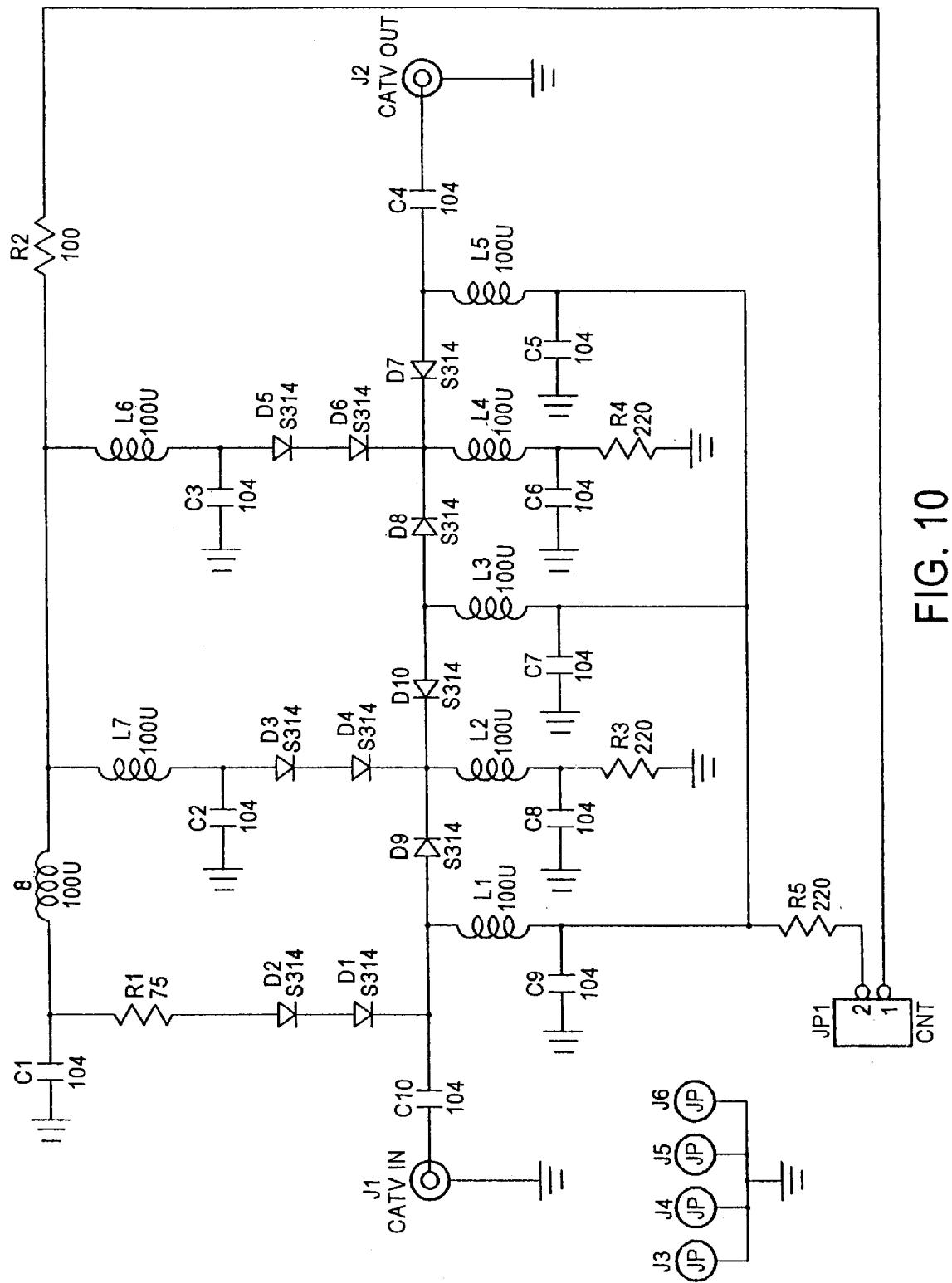
FIG. 10 is a circuit diagram of a RF electronic switch for the addressable CATV end-user payment collection management system.

The central processing unit control circuit 34, as shown in FIG. 7, is comprised of IC8751 and IC8255. It receives the control signal from the forward control signal transmitting and receiving circuit 35 for controlling closing/opening of RF electronic switches 36, so as to further control the presence of video signal at every end-user. The central processing unit control circuit 34 also monitors the signal receiving condition at every end-user. When an abnormal signal receiving condition occurs, the central processing unit control circuit 34 outputs a control signal to the forward control signal transmitting and receiving circuit 35. The RF electronic switches 36 (see FIG. 10) are controlled by the central processing unit control circuit 34 to close/open the channels at the end-users.

The addressable CATV end-user payment collection management system eliminates the procedure of sending workmen to cut the line from every end-user who didn't pay for the payment fell due a predetermined length of time after due date. After the end-user has been paid for the overdue payment, the payment collection computer data bank 10 immediately sends a start signal to the corresponding on-line programmable control signal distributor 30. Enabling the end-user in question to receive the signal again. Like the operation of the telecommunication off (post office) in cutting/resuming the line.

The addressable CATV end-user payment collection management system can be arranged with different working modules subject to the CATV station's demands and system architecture. If the network of the CATA station provides a bi-directional transmission function, a network manager may be added to monitor every programmable control signal distributor 30 and the signal transmitting condition at every channel in the network. If any line in the network is cut illegally by a third party, or the signal at any line in the network is intercepted, the message is immediately sent to the control center, informing the engineer to take a check. For a CATV station that uses a one-way transmission system, the addressable CATV end-user payment collection management system achieves end-user payment collection management and classified payment management functions.

Using the addressable CATV end-user payment collection management system of the present invention helps the CATV station save much time and labor in managing end-user payment collection, urging end-user to pay payment fell due, handling line cutting and resuming jobs, and preventing interception. Because all end-users' payment collection record can be inquired through the computer, and signal cutting and resuming works can be controlled through the computer, human error is eliminated.

As indicated above, the addressable CATV end-user payment collection management system of the present invention achieves the following advantages:

1. Payment collection system and channel broadcasting system are synthesized for easy management.
2. Because closing and opening of video signal are directly controlled by the computer, much labor and material cost is saved.
3. Because the system achieves a two-way monitoring control function, interception is eliminated.

What at the invention claimed is:

1. An addressable CATV end-user payment collection management system comprising:
 a cable TV broadcasting system, said cable TV broadcasting system comprising a plurality of demodulators, which demodulate signals from different channels, a video signal main cable for signal output, a mixer, which mixes the signals received from said demodulators into an end-user receivable video signal, and then sends the mixed video signal to the end users through said video signal main cable;
 a cable modem;
 a payment collection computer data bank for storing and processing data of the end-users, and producing a control signal to said cable modem subject to the payment data of the end-users;

said cable modem being connected between said cable TV broadcasting system and said payment collection computer data bank for sending the control signal from said payment collection computer data bank to the mixer of said cable TV broadcasting system for mixing with said video signal for synchronous output; and a plurality of signal distributors respectively connected to said video signal main cable for distributing said video signal to the end-users, said signal distributors each comprising a programmable central processing unit for receiving the control signal from said payment collection computer data bank through said cable modem for closing/opening the line at each individual end-user;

a voice payment urging and end-user encryption channel setting system for connecting said payment collection computer data bank to a phone line through a voice modem, for urging the end-user to use the system to encrypt the channels by means of a telephone;

said signal distributors each comprising a main cable input output circuit, power and carrier signal separator circuit, a switching type voltage stabilizing power circuit, a central processing unit control circuit, and a forward control signal transmitter and receiver circuit, said main cable input output circuit being connected to said power and carrier signal separator circuit, said power and carrier signal separator circuit separating power supply from carrier signal, enabling power supply signal to be transmitted to said switching type voltage stabilizing power circuit to provide said central processing unit control circuit with the necessary working voltage, and carrier signal to be sent to said forward control signal transmitter and receiver circuit, said forward control signal transmitting and receiving circuit processing carrier signal for two-way signal transmission with said central processing unit control circuit by means of a FSK circuit thereof, said forward control signal transmitting and receiving circuit comprising a forward control signal transmitter, which sends a monitoring signal produced by said central processing unit control circuit back to said payment collection computer data bank, and a control signal receiver, which receives the control signal from said payment collection computer data bank and then sends the control signal to said central processing unit control circuit receiving the control signal from said forward control signal transmitting and receiving circuit for controlling closing/opening of RF electronic switches, so as to further control the presence of video signal at every end-user, said central processing unit control circuit outputting a control signal to said forward control signal transmitting and receiving circuit when an abnormal signal receiving condition occurs, said RF electronic switches being controlled by said central processing unit control circuit to close/open the channels at the end-users.

2. The addressable CATV end-user payment collection management system of claim 1 wherein said payment collection computer data bank is comprised of a data bank server, at least one front payment collection computer through which all the cable TV end-users' data are inputted into the payment collection computer data bank and then stored in said data bank server, and a system control computer for transmitting said control signal to said cable modem.

* * * * *